United States Patent
Kulkarni et al.

(10) Patent No.: US 9,745,415 B2
(45) Date of Patent: Aug. 29, 2017

(54) SULFONATED CO-POLYESTERS AND METHOD FOR MANUFACTURING

(71) Applicant: Ester Industries Limited, Charubeta, Khatima, Uttarakhand (IN)

(72) Inventors: Sanjay Kulkarni, Uttarakhand (IN); Dilly Raj, Uttarakhand (IN); Kandula Muniswamy Reddy, Uttarakhand (IN); Chandrakant Onkar Vyas, Uttarakhand (IN)

(73) Assignee: ESTER INDUSTRIES LIMITED, Charubeta (IN)

( * ) Notice: Subject to any disclaimer, the term of this patent is extended or adjusted under 35 U.S.C. 154(b) by 399 days.

(21) Appl. No.: 14/527,338

(22) Filed: Oct. 29, 2014

(65) Prior Publication Data

US 2015/0240030 A1    Aug. 27, 2015

(30) Foreign Application Priority Data

Feb. 21, 2014  (IN) .............. 503/DEL/2014

(51) Int. Cl.
| | |
|---|---|
| C08G 63/688 | (2006.01) |
| C08G 63/80 | (2006.01) |
| C08G 63/91 | (2006.01) |
| C08L 67/04 | (2006.01) |
| D01F 8/14 | (2006.01) |

(52) U.S. Cl.
CPC ....... *C08G 63/916* (2013.01); *C08G 63/6886* (2013.01)

(58) Field of Classification Search
CPC .............. C08G 63/916; C08G 63/6886
See application file for complete search history.

(56) References Cited

U.S. PATENT DOCUMENTS

| | | | |
|---|---|---|---|
| 3,018,272 A | 1/1962 | Griffling et al. | |
| 3,328,484 A | 6/1967 | Alliot-Lugaz et al. | |
| 3,846,507 A | 11/1974 | Thomm et al. | |
| 4,427,557 A * | 1/1984 | Stockburger ....... | C08G 63/6886 252/8.62 |
| 4,978,740 A | 12/1990 | Kawamoto et al. | |
| 5,108,684 A | 4/1992 | Anton et al. | |
| 5,129,947 A | 7/1992 | Sharma et al. | |
| 5,242,733 A | 9/1993 | Windley | |
| 5,498,386 A | 3/1996 | Lin et al. | |
| 6,133,382 A | 10/2000 | Studholme | |
| 6,300,405 B2 | 10/2001 | Chisholm et al. | |
| 6,331,606 B1 * | 12/2001 | Sun ............ | C08G 63/6886 528/295 |
| 6,433,107 B1 | 8/2002 | Studholme | |
| 6,437,054 B1 | 8/2002 | Chisholm et al. | |
| 6,476,157 B2 | 11/2002 | Chisholm et al. | |
| 6,495,079 B1 | 12/2002 | Gallucci et al. | |
| 6,537,475 B1 | 3/2003 | Studholme | |
| 6,589,466 B2 | 7/2003 | Studholme | |
| 6,635,346 B2 | 10/2003 | Studholme | |
| 6,680,018 B2 | 1/2004 | Studholme | |
| 6,753,385 B2 | 6/2004 | Studholme | |
| 6,787,245 B1 * | 9/2004 | Hayes ............ | B32B 27/36 428/221 |
| 6,831,123 B1 | 12/2004 | Chisholm et al. | |
| 6,930,164 B1 | 8/2005 | Brunelle et al. | |
| 7,115,224 B2 | 10/2006 | Studholme | |
| 7,928,150 B2 | 4/2011 | Kannan et al. | |
| 8,163,385 B2 | 4/2012 | Gupta et al. | |
| 8,444,895 B2 | 5/2013 | Haile et al. | |
| 8,444,896 B2 | 5/2013 | Haile et al. | |
| 2004/0176479 A1 | 9/2004 | Scher et al. | |
| 2004/0242838 A1 * | 12/2004 | Duan ............ | C08G 63/688 528/293 |
| 2006/0177930 A1 | 8/2006 | Bramucci et al. | |
| 2008/0009574 A1 * | 1/2008 | Huenefeld ........ | C08G 63/183 524/384 |
| 2009/0123767 A1 | 5/2009 | Gohil et al. | |
| 2012/0282431 A1 | 11/2012 | Chang et al. | |
| 2013/0190425 A1 | 7/2013 | Zhu et al. | |
| 2013/0295306 A1 | 11/2013 | Kim et al. | |

FOREIGN PATENT DOCUMENTS

| | | |
|---|---|---|
| JP | 57-023627 | 2/1982 |
| JP | 2008-240200 | 10/2008 |
| WO | WO-2008/075373 | 6/2008 |
| WO | WO-2009/066310 | 5/2009 |

OTHER PUBLICATIONS

International Preliminary Report on Patentability issued on PCT/IB14/02278, mailed Aug. 23, 2016.
International Search Report for PCT/IB14/02278, mailed Mar. 27, 2015.

* cited by examiner

*Primary Examiner* — Christopher M Rodd
(74) *Attorney, Agent, or Firm* — Foley & Lardner LLP

(57) ABSTRACT

A method of forming a polymer includes polymerizing a first pre-polymer, produced by the reaction of a dicarboxylic acid, or ester thereof with a first alkylene diol; with a second pre-polymer produced by the reaction of an aromatic sulfonate or a salt thereof, or ester thereof, with a second alkylene diol; to form a metal sulfonate co-polymer; reacting the metal sulfonate co-polymer with a fast crystallizing polyester block having a degree of polymerization of at least about 20 to provide an amorphous sulfonated co-polyester; and crystallizing the amorphous sulfonated co-polyester to form a crystallized sulfonated co-polyester.

18 Claims, No Drawings

SULFONATED CO-POLYESTERS AND METHOD FOR MANUFACTURING

CROSS-REFERENCE TO RELATED APPLICATIONS

This U.S. patent application claims the benefit of priority to Indian Patent Application 503/DEL/2014, filed on Feb. 21, 2014, the entire disclosure of which is incorporated herein by reference for any and all purposes.

FIELD

The present technology is generally related to modified co-polyesters and polyamides. More particularly, it relates to a manufacturing method for sulfonated co-polyester and products thereof, with improved dyeability and stain resistance.

BACKGROUND

Polyesters and polyamides are widely used in a variety of applications, such as in apparel, fibers, films, and plastics. This is, in part, due to their excellent mechanical and physical properties. Such polyester fibers have become the first choice for apparel and are used in textile applications such as manufacture of trousers, skirts, dresses, suits, jackets, blouses, outdoor clothing, and carpets. Polyester fibers have good moisture transport, dry quickly, high tenacity, dyeability, easy handling properties, dye fastness, innovative designs, and different shades. Incorporation of cationic sulfonated molecules into polyesters imparts improved dyeing with a wide range of dyes. Where polyester fibers are to be used, chemical modification of the underlying polyester with functional groups may be required. For example, the dyeability of polyethylene terephthalate is much greater when functionalized with certain groups as compared to polyethylene terephthalate without functionalization. Chemical modification of polyethylene terephthalate to introduce functional groups, permits a substantial change in its dyeability without a significant change in its physiomechanical properties.

Chemically modified, cationic-free dyeable polyester (CFDP) is produced by adding certain additives, such as polyethylene glycol (PEG), adipic acid, or azillic acid to form block polymers with polyesters. Such polyesters exhibit good dyeability at 100° C., as well as good physical properties and tensile strengths that are comparable with the normal polyester. The glass transition temperature ($T_g$) of such fibers is about 100° C. This is lower than normal polyester, thus leading to a higher segmental mobility. This, in turn, increases the rate of dye diffusion into fibers at a lower temperature, providing for dyeing of deep shades, even in the absence of carriers. Carrier-free dyeable polyester, however, is associated with many problems. Illustrative problems include homogeneous dyeing, color retention, and wash fastness of dyeing. Wash fastness of the dyeing is slightly lower for these fibers than normal polyester fibers because of the fiber structure. Thus, appropriate instructions should be given to consumers to wash CFDP products at temperatures below 50° C.

In the case of normal (i.e. non-ionic) polyesters, there are no sites for ionic interaction with ionic dyes. Accordingly, normal polyesters may only be dyed by disperse dyes. Compared to ionic dyes, disperse dyes have smaller molecular extinction coefficients (i.e. less intense colorations) and lower build-up properties. Therefore, these dyes cannot impart bright and deep colors. Moreover, fastness to sublimation and wet treatments of disperse dyes are relatively poor compared to other classes of dyes.

Cationic dyeable polyesters are generally prepared by the co-polymerization of an isophthalic acid component containing a sulfonic acid group, which makes it possible to use cationic dyestuffs for polyester staple fibers and filaments. Generally, the sodium salt of 5-sulfo-isophthalic acid (Na-SIPA) is used as a cationic co-monomer. The cationic dyestuff may contain amino groups, ammonium groups, or quaternary nitrogen-heterocyclic groups.

Dyeing of CD-PET (cationic dyeable polyethylene terephthalate) is conducted using ion exchange methods. In such methods, sodium cations ($Na^+$) from the CD-PET are substituted with bigger cations. Thus, polyethylene terephthalate is chemically modified in a manner that cationic dyestuffs can form a chemical complex with the fiber.

The chemistry of producing CD-PET, however, has traditionally been complicated because of the acidic character of Na-SIPA (sodium κ-sulfo-isophthallic acid), especially in connection with hydrolytic or glycolytic conversion. Therefore, after direct addition of this salt at the polyethylene terephthalate esterification stage, diethylene glycol (DEG) formation reaches high levels because ether formation is acid-catalyzed. Additionally, the acidic character enhances the $TiO_2$ agglomeration. The result is difficulty in spinning fibers, and a low melting point of CD-PET. Attempts have been made to avoid these problems by adding bis(hydroxyl ethyl) isophthalate-5-sulfonate at the end of esterification step. This is separately prepared by using the cationic salt monomer 5-sulfoisophthalic acid (SIPA)/dimethyl-5-sulfoisophthalate (DMSP) with monoethyleneglycol (MEG). As a result, diethylene glycol formation is minimized but issues related to spinability remain, primarily due to the formation of trimers, tetramers, and oligomers during the preparation of bis(hydroxyethyl)isophthalate-5-sulfonate.

SUMMARY

In one aspect, methods of making sulfonated co-polyesters are provided. The methods provide a modified co-polyester that is capable of improving the dyeing affinity of the normal PET and can also improve the stain and soil resistance of the polyamides. The methods include polymerizing a first pre-polymer with a second pre-polymer to form a metal sulfonate co-polymer, reacting the metal sulfonate co-polymer with a fast crystallizing polyester block to provide an amorphous sulfonated co-polyester, and crystallizing the amorphous sulfonated co-polyester to form crystallized sulfonated co-polyester. In some embodiments, the first pre-polymer may include the reaction product of a dicarboxylic acid, or ester thereof, and a first alkylene diol, and the second pre-polymer may include the reaction product of an aromatic sulfonate, or a salt or ester thereof, with a second alkylene diol. In some embodiments, the fast crystallizing polyester block may have a degree of polymerization of at least about 20.

In another aspect, provided is a co-polyester obtained by the method described herein. The co-polyester includes 40 to 90% of a first pre-polymer having degree of polymerization between 4 to 10, comprising alkylene aryl dicarboxylate derived from one or more aromatic dicarboxylic acid or ester thereof and one or more alkylene diol; 5 to 30 wt % of a second pre-polymer having degree of polymerization between 2 to 5, which includes metal sulfonate polyester obtained from at least one metal sulfonated aromatic dicarboxylic acid or ester thereof and ethylene glycol; 5 to 30 wt % of one or more fast crystallizing polyester block having degree of polymerization greater than 20; one or more reagents that include, but are not limited to, a liquid plasticizer in an amount of 0.5 to 2 wt %; at least one nucleating agent in an amount of 10 ppm to 2000 ppm; at least one branching agent in an amount of 10 ppm to 2000 ppm; at least one anti-oxidizing agent in an amount ranging from 0.1 to 5 wt %; at least one stabilizing agent; at least one additive and optionally, at least one end-capped oligomer in an amount of 1 to 20 wt %. The co-polyester is characterized by at least one of the following properties: intrinsic viscosity greater than 0.25 dL/g; oligomer content less than 1.2 wt %; diethylene content less than 0.5 wt %; carboxylic end group less than 50 meq/kg, crystallinity greater than 25%; and sulfonated salt content greater than 15%.

In yet another aspect, provided is a sulfonated co-polyester product for use in fiber and yarn manufacturing is provided, said co-polyester product characterized by at least one of the following properties: PET equivalent I.V. up to 1.2 dL/g; oligomer content less than 1.2 wt %.; diethylene content less than 0.5 wt %; carboxylic end group less than 50 meq/kg; crystallinity greater than 25%; and sulfonated salt content greater than 15%. In some embodiments, a blend of the sulfonated co-polyester with polyethylene terephthalate exhibits a greater cationic dyeing affinity than a non-blended polyethylene terephthalate. In other embodiments, a blend of the sulfonated co-polyester with a nylon exhibits improved, low temperature stain resistance compared a non-blended nylon.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, $C_m$-$C_n$, such as $C_1$-$C_{12}$, $C_1$-$C_8$, or $C_1$-$C_6$ when used before a group refers to that group containing m to n carbon atoms As used herein, "alkyl" groups include straight chain and branched alkyl groups having from 1 to about 20 carbon atoms (i.e., $C_1$-$C_{20}$ alkyl), and typically from 1 to 12 carbon atoms (i.e., $C_1$-$C_{12}$ alkyl) or, in some embodiments, from 1 to 8 carbon atoms (i.e., $C_1$-$C_8$ alkyl). As employed herein, "alkyl groups" include cycloalkyl groups as defined below. Alkyl groups may be substituted or unsubstituted. This term includes, by way of example, linear and branched hydrocarbyl groups such as methyl ($CH_3$—), ethyl ($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), sec-butyl (($CH_3)(CH_3CH_2)CH$—), t-butyl (($CH_3)_3C$—), n-pentyl ($CH_3CH_2CH_2CH_2CH_2$—), and neopentyl (($CH_3)_3CCH_2$—). Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

The term "including" is used to mean "including but not limited to." "Including" and "including but not limited to" are used interchangeably.

The term "degree of polymerization" (DP) is an art recognized term referring to the number of monomer units in a polymer The term "fast crystallizing polymer" refers to polymers that can achieve higher crystallinity than normal PET while heating solidified polymer article or while cooling from molten polymer. They have $T_{ch}$ (peak crystallinity temperature while heating) lower than normal PET and $T_{cc}$ (peak crystallinity temperature during cooling molten polymer) higher than normal PET. In some embodiments the fast crystallizing polymer is a fast crystallizing polyester.

The term "oligomer content" refers to a molecule of intermediate relative molecular mass, the structure of which essentially comprises a small plurality of units derived, actually or conceptually, from molecules of lower relative molecular mass. short and is determined by Soxhlet reflux method as described in the example section of the present disclosure.

The term "diethylene content" refers to residue of diethylene glycol (DEG) present in the final product and is determined by the method described in the example section of the present disclosure.

The term "carboxylic end group content" refers to —COOH end group present at the end of polymer chains and is determined by the method described in the example section of the present disclosure.

The term "crystallinity" refers to orderly arrangement of molecules and is determined by DSC measurement or density gradient method as described in the example section of the present disclosure.

The term "sulfonated salt content" refers to amount of the metal sulfonated salt present in the crystallizable sulfonated co-polyester produced from the method disclosed in the present disclosure and is determined by the method described in the example section of the present disclosure.

The term "end-capped oligomer" refers to oligomers having degree of polymerization (DP) greater than 10 with no reactive end groups.

The term "terpolymer" refers to a copolymer consisting of three blocks of distinct co-monomers The polyester obtained in accordance with the method of the present invention is herein also referred as "Sulfonated Co-polyester" or "Modified Co-polyester."

The term "sulfonate" refers to a salt of a sulfonic acid having the structure "—$SO_3M$" wherein M is the cation of the sulfonate salt.

The term "intrinsic viscosity" (I.V.) as used herein is a measure of the molecular mass of the polymer and is measured by dilute solution using a Ubbelohde viscometer. All intrinsic viscosities are measured in a 60:40 mixture of phenol and s-tetrachloroethane with 0.5% concentration.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

In one aspect, methods are provided preparing sulfonated co-polyesters and a masterbatch thereof for industrial applications such as textile, apparel, carpet, plastics etc., which can impart improved dying affinity to polyesters and can improve the stain and soil resistance to polyamides. The methods include polymerizing a first pre-polymer with a second pre-polymer to form a metal sulfonate co-polymer, reacting the metal sulfonate co-polymer with a fast crystallizing polyester block to provide an amorphous sulfonated co-polyester, and crystallizing the amorphous sulfonated co-polyester to form a crystallized sulfonated co-polyester and subsequently upgrading the same to required viscosity in solid state polymerization (SSP) process. In some embodiments, the first pre-polymer may include the reaction product of a dicarboxylic acid, or ester thereof, and a first alkylene diol, and the second pre-polymer may include the reaction product of an aromatic sulfonate, or a salt or ester thereof, with a second alkylene diol. In some embodiments, the fast crystallizing polyester block may have a degree of polymerization of at least about 20.

In one aspect, a method of preparing a crystallized sulfonated co-polyester is provided wherein the crystallized sulfonated co-polyester exhibits an intrinsic viscosity greater than about 0.75 dL/g. In some embodiments, the I.V. is greater than about 0.5 dL/g. In some embodiments, the I.V. is greater than about 0.3 dL/g. In some embodiments, the I.V. is greater than about 0.25 dL/g. In some embodiments, the I.V. is greater than about 0.2 dL/g. In some embodiments, the I.V. is greater than about 0.15 dL/g. In some embodiments, the I.V. is greater than about 0.10 dL/g. The crystallized sulfonated co-polyester may exhibit an intrinsic viscosity from about 0.1 dL/g to about 1 dL/g. This may include an I.V. from about 0.2 dL/g to about 1 dL/g, from about 0.3 dL/g to about 0.75 dL/g, or from about 0.4 dL/g to about 0.5 dL/g, and ranges between and including any two of these values. In some embodiments, the crystallized sulfonated co-polyester exhibits an intrinsic viscosity greater than 0.25 dL/g. In some embodiments, the crystallized sulfonated co-polyester exhibits an intrinsic viscosity greater than 0.15 dL/g.

In one aspect, a method of preparing a crystallized sulfonated co-polyester is provided wherein the crystallized sulfonated co-polyester exhibits an oligomer content of less than about 10 wt %. In some embodiments, the oligomer content is less than about 5 wt %. In some embodiments, the oligomer content is less than 1 about wt %. In some embodiments, the oligomer content is less than 0.75 about wt %. In some embodiments, the oligomer content is less than about 0.5 wt %. In some embodiments, the oligomer content is less than about 0.25 wt %. In some embodiments, the oligomer content is less than about 0.1 wt %. The crystallized sulfonated co-polyester may exhibit an oligomer content from about 0.001 wt % to about 1.0 wt %, from about 0.01 wt % to about 0.8 wt %, from about 0.1 wt % to about 0.5 wt %, or from about 0.2 wt % to about 0.4 wt %, and ranges between and including any two of these values. In some embodiments, the crystallized sulfonated co-polyester exhibits an oligomer content of less than about 0.5 wt %.

In one aspect, a method of preparing a crystallized sulfonated co-polyester is provided wherein the crystallized sulfonated co-polyester exhibits a diethylene content of less than about 10 wt %. This may include where the diethylene content is less than about 5 wt %, less than about 1 wt %, less than about 0.75 wt %, less than about 0.5 wt %, less than about 0.25 wt %, or less than about 0.1 wt %. The crystallized sulfonated co-polyester may exhibit a diethylene content from about 0.001 wt % to about 1.0 wt %, from about 0.01 wt % to about 0.8 wt %, from about 0.1 wt % to about 0.5 wt %, or from about 0.2 wt % to about 0.4 wt %, and ranges between and including any two of these values. In some embodiments, the crystallized sulfonated co-polyester exhibits a diethylene content of less than about 0.5 wt %.

In one aspect, a method of preparing a crystallized sulfonated co-polyester is provided wherein the crystallized sulfonated co-polyester exhibits a carboxylic end group content of less than about 100 meq/kg. This may include a carboxylic end group content of less than about 80 meq/kg, less than about 50 meq/kg, less than about 40 meq/kg, less than about 25 meq/kg, or less than about 10 meq/kg. The crystallized sulfonated co-polyester may exhibit a carboxylic end group content from about 0.001 meq/kg to about 100 meq/kg, from about 0.01 meq/kg to about 80 meq/kg, from about 0.1 meq/kg to about 75 meq/kg, from about 1 meq/kg to about 50 meq/kg, from about 5 meq/kg to about 40 meq/kg, or from about 10 meq/kg to about 30 meq/kg, and ranges between and including any two of these values. In some embodiments, the crystallized sulfonated co-polyester exhibits a carboxylic end group content of less than about 50 meq/kg.

In one aspect, a method of preparing a crystallized sulfonated co-polyester is provided wherein the crystallized sulfonated co-polyester exhibits a sulfonated salt content of greater than or equal to about 1 wt %. This may include a sulfonated salt content of greater than or equal to about 5 wt %, greater than or equal to about 10 wt %, greater than or equal to about 15 wt %, greater than or equal to about 20 wt %, greater than or equal to about 25 wt %, or greater than or equal to about 50 wt %. The crystallized sulfonated co-polyester may exhibit a sulfonated salt content from about 0.1 wt % to about 80 wt %, from about 5 wt % to about 50 wt %, from about 10 wt % to about 45 wt %, from about 13 wt % to about 40 wt %, from about 15 wt % to about 40 wt %, or from about 20 wt % to about 30 wt %, and ranges between and including any two of these values. In some embodiments, the crystallized sulfonated co-polyester exhibits a sulfonated salt content of greater than or equal to about 15 wt %.

In one aspect, a method of preparing a crystallized sulfonated co-polyester is provided wherein the crystallized sulfonated co-polyester exhibits a crystallinity of greater than or equal to about 5%. This may include where the crystallinity is greater than or equal to about 10%, greater than or equal to about 20%, greater than or equal to about 25%, greater than or equal to about 30%, greater than or equal to about 35%, or greater than or equal to about 50%. The crystallized sulfonated co-polyester may exhibit a crystallinity from about 0.1% to about 80%, from about 5% to about 50%, from about 10% to about 45%, from about 15% to about 40%, or from about 20% to about 30%, and ranges between and including any two of these values. In some embodiments, the crystallized sulfonated co-polyester exhibits crystallinity of greater than about 25%.

In one aspect, a method of preparing a crystallized sulfonated co-polyester is provided wherein the crystallized sulfonated co-polyester exhibits at least one of:
  an intrinsic viscosity greater than 0.15 dL/g;
  an oligomer content of less than 1.5 wt %;
  a diethylene content of less than 1.5 wt %;
  a carboxylic end group content of less than 150 meq/kg;
  a crystallinity greater than 20% by density gradient column; and
  a sulfonated salt content greater than or equal to 15 wt %.

The method further includes subjecting the crystallized sulfonated co-polyester to solid state polymerization (SSP). The SSP leads to an increase in the molecular weight and/or intrinsic viscosity of the co-polyester product and reduction in oligomer contents.

In another aspect, provided is a method of preparing a sulfonated co-polyester which involves the preparation of two pre-polymers, a first pre-polymer and a second pre-polymer, wherein the first pre-polymer includes a dicarboxylic acid or ester thereof and alkylene diol, and the second pre-polymer includes sulfonated dicarboxylic acid or ester thereof and alkylene diol. The first pre-polymer and the second pre-polymer are further mixed and polymerized to obtain the intermediate sulfonated copolymer. The intermediate sulfonated copolymer is then reacted with a fast crystallizing polymer e.g., a fast crystallizing polyester, to obtain an amorphous co-polyester. The fast crystallizing polyester enables crystallization that helps in upgrading the co-polyester to required intrinsic viscosity. The amorphous co-polyester can be pre-crystallized using known methods, e.g. using fluid bed crystallizer, tumble dryer or rotary crystallizer. The amorphous co-polyester can be further crystallized to form a crystallized granules and further upgraded by solid state polymerization. The crystallized sulfonated co-polyester can then be used as a masterbatch to produce polymer compositions such as polyesters and polyamides.

In some embodiments, the sulfonated co-polyester is a block terpolymer having the following formula:

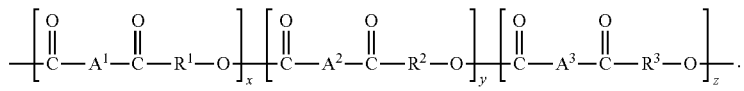

In the formula, $A^1$ is a divalent radical derived from a dicarboxylic acid or an ester thereof; $A^2$ is a divalent radical derived from an aromatic sulfonate, or a salt or ester thereof; $A^3$ is a divalent radical derived from a dicarboxylic acid or an ester thereof; $R^1$, $R^2$ and $R^3$ each independently represent a residue derived from an alkylene diol; and x, y and z represent the degree of polymerization for the respective co-polymers.

$A^1$ may be a divalent radical derived from an aliphatic dicarboxylic acid, an aliphatic dicarboxylate, a cycloaliphatic dicarboxylic acid, a cycloaliphatic dicarboxylate, an aromatic dicarboxylic acid, or an aromatic dicarboxylate, or ester derivatives thereof. In some embodiments, $A^1$ is a divalent radical derived from terephthalic acid, isophthalic acid, 2,6-naphthalene dicarboxylic acid, adipic acid, glutaric acid, succinic acid, or azelaic acid, or ester derivatives thereof. In some embodiments, $A^1$ is a divalent radical derived from terephthalic acid or isophthalic acid or ester derivatives thereof. In some embodiments, $A^1$ is phenyl.

$A^2$ may be a divalent radical derived from terephthalic acid sulfonate, isophthalic acid sulfonate (SIPA), 2,6-naphthalene dicarboxylic acid sulfonate, 3,4'-diphenyl ether dicarboxylic acid sulfonate, hexahydrophthalic acid sulfonate, 2,7-naphthalenedicarboxylic acid sulfonate, phthalic acid sulfonate, 4,4'-methylenebis(benzoic acid) sulfonate, and or a salt thereof. In some embodiments, $A^2$ is derived from a metal salt of an aromatic sulfonate wherein the metal is Li, Na, K, Mg, Ca, Ni, or Fe. In some embodiments, $A^2$ is a substituted aryl sulfonate metal salt. In some embodiments, $A^2$ is a substituted phenyl sulfonate metal salt. In some embodiments, $A^2$ is a substituted phenyl sulfonate sodium salt. In some embodiments, $A^2$ is a phenyl sulfonate metal salt, wherein the phenyl ring is optionally substituted with halogen, $C_1$-$C_6$ alkyl or $C_6$-$C_{10}$ aryl group.

$A^3$ may be a divalent radical derived from an aliphatic dicarboxylic acid, an aliphatic dicarboxylate, a cycloaliphatic dicarboxylic acid, a cycloaliphatic dicarboxylate, an aromatic dicarboxylic acid, or an aromatic dicarboxylate, or ester derivatives thereof. In some embodiments, $A^3$ is a divalent radical derived from terephthalic acid, isophthalic acid, 2,6-naphthalene dicarboxylic acid, adipic acid, glutaric acid, succinic acid, or azelaic acid, or ester derivatives thereof. In some embodiments, $A^3$ is a divalent radical derived from terephthalic acid or isophthalic acid or ester derivatives thereof. In some embodiments, $A^3$ is phenyl.

$R^1$, $R^2$ and $R^3$ may each independently represent a residue derived from an alkylene diol that is ethylene glycol, propanediol, butanediol, cyclohexanedimethanol, or hexane diol. In some embodiments $R^1$, $R^2$ and $R^3$ are each independently $C_1$-$C_8$ alkyl. In some embodiments $R^1$, $R^2$ and $R^3$ are each independently $C_1$-$C_6$ alkyl. In some embodiments $R^1$, $R^2$ and $R^3$ are each independently methyl, ethyl, propyl, or butyl. In some embodiments $R^1$ is ethyl. In some embodiments $R^2$ is ethyl. In some embodiments $R^3$ is butyl.

In some embodiments, x, y and z each independently represent a degree of polymerization which can range from 2 to greater than 100. For example, the degree of polymerization can range from about greater than 80, about greater than 50, about greater than 20, about greater than 10 or about greater than 6. In some embodiments, x, y and z each independently represent a degree of polymerization which ranges from about 2 to about 50, about 2 to about 20, or about 2 to about 10, and ranges between and including any two of these values. In some embodiments, x represents a degree of polymerization greater than 4. In some embodiments, y represents a degree of polymerization greater than 2. In some embodiments, y represents a degree of polymerization of greater than 20. In some embodiments, x represents a degree of polymerization from 4 to 10. In some embodiments, y represents a degree of polymerization from 2 to 5. In some embodiments, z represents a degree of polymerization of at least about 20.

In one aspect, the method includes preparation of the first pre-polymer and the second pre-polymer. In one embodiment, the first pre-polymer is produced by the esterification of a dicarboxylic acid, or an ester thereof, with a first alkylene diol. Suitable dicarboxylic acids or esters thereof are disclosed herein and include, but are not limited to an aliphatic dicarboxylic acid, aliphatic dicarboxylate, a cycloaliphatic dicarboxylic acid, cycloaliphatic dicarboxylate, an aromatic dicarboxylic acid, aromatic dicarboxylate, or a combination thereof. The degree of polymerization of the alkylene aryl dicarboxylate co-polymer can range from 2 to greater than 100. For example, the degree of polymerization can range from about 2 to about 50, about 2 to about 20, or about 2 to about 10, and ranges between and including any two of these values. In some embodiments, the first pre-polymer includes an alkylene aryl dicarboxylate co-polymer having a degree of polymerization from 4 to 10. In some embodiments, the first pre-polymer includes an alkylene aryl dicarboxylate co-polymer having a degree of polymerization≥4.

The co-polymer can be prepared from two or more dicarboxylic acid residues. The dicarboxylic acid residue may be derived from a aliphatic dicarboxylic acid, an aliphatic dicarboxylate, a cycloaliphatic dicarboxylic acid, a cycloaliphatic dicarboxylate, an aromatic dicarboxylic acid, or an aromatic dicarboxylate or a combination of any two or more thereof. Examples of aromatic dicarboxylic diacids include terephthalic acid, isophthalic acid, 2,6-naphthalene dicarboxylic acid, and ester derivatives thereof. Examples of aliphatic diacids include adipic acid, glutaric acid, succinic acid, azelaic acid, or ester derivatives thereof.

The dicarboxylic acid residue may be from terephthalic acid, dimethyl terephthalate, dimethyl isophthalate, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), dimethyl oxalate, malonic acid, dimethyl malonate, dimethyl succinate, methylsuccinic acid, 2-methylglutaric acid, 3-methylglutaric acid, dimethyl adipate, 3-methyladipic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, dimethyl-1,4-cyclohexanedicarboxylate, dimethyl-1,3-cyclohexanedicarboxylate, 1,1-cyclohexanediacetic acid, metal salts of 5-sulfo-dimethylisophthalate, maleic anhydride, or a combination of any two or more thereof.

Some non-limiting examples of dicarboxylic acid residue are isophthalic acid, 2,6-naphthalene dicarboxylic acid, oxalic acid, maleic acid, succinic acid, glutaric acid, dimethyl glutarate, adipic acid, 2,2,5,5-tetramethylhexanedioic acid, pimelic acid, suberic acid, azelaic acid, 1,4-cyclohexanedicarboxylic acid, 1,3-cyclohexanedicarboxylic acid, 1,1-cyclohexanediacetic acid, fumaric acid, maleic acid, hexahydrophthalic acid, and phthalic acid.

The first pre-polymer can be prepared using suitable methods known in the art. For example, the dicarboxylic acid or ester thereof can be reacted with an alkylene diol at a suitable temperature and pressure for a sufficient amount of time to obtain the first pre-polymer. Suitable esterification conditions can be employed for the preparation of the first pre-polymer. For example, the reaction can be conducted at a temperature of about 300° C. or below, about 200° C. or below, about 100° C. or below, at about 80° C. or below, at about 50° C. or below, at about 45° C. or below, at about 40°

C. or below, at about 35° C. or below, at about 30° C. or below, at about 25° C. or below or at about 20° C. or below, and ranges between and including any two of these values. The reaction can be conducted at a pressure of about 1 bar to about 30 bars, about 2 bars to about 20 bars, about 3 bars to about 10 bars, about 4 bars to about 5 bars, and ranges between and including any two of these values. In some embodiments, the reaction pressure is up to about 20 bars, up to about 10 bars, up to about 5 bars, up to about 3 bars, up to about 2 bars, up to about 1 bar, and ranges between and including any two of these values. The reaction can be conducted for a period of about 1 min to about 60 min, about 1 h to about 5 h, about 5 h to about 8 h, about 8 h to about 15 h, about 15 h to about 25 h, about 25 h to about 40 h, and ranges between and including any two of these values. In some embodiments, the reaction of dicarboxylic acid or ester thereof with an alkylene diol is conducted at a temperature of about 240° C. to about 260° C. and at a pressure of up to about 4 bars for about 2 h to about 3 h.

In some embodiment, the first prepolymer used in the method may be prepared by methods known in the art, such as for example, DMT or PTA route using PTA/DMT and MEG. It can also be produced using clean PCR (Post-consumer recycled) PET flakes in place of PTA/DMT and MEG. In some embodiments, batch or continuous polymerization methods can be used. In some embodiment, the first pre-polymer is prepared by post-consumer recycled PET flakes.

The first pre-polymer may be added to the sulfonated co-polyester composition at various amounts. In some embodiments, the first pre-polymer is added in an amount ranging from about 0.01% to about 99% by weight of the total weight of the sulfonated co-polyester. This includes embodiments in which the amount ranges from about 10% to about 99%, from about 20% to about 95%, from about 30% to about 92%, from about 40% to about 90%, from about 50% to about 80% and from about 60% to about 75% of the total weight of the co-polyester composition, and ranges between any two of these values or less than any one of these values. In some embodiments, the first pre-polymer may constitute from about 0.01 wt %, about 10 wt %, about 20 wt %, about 30 wt %, about 40 wt %, about 50 wt %, about 60 wt %, about 70 wt %, about 80 wt %, about 90.0 wt %, about 95.0 wt %, about 99.0 wt %, and ranges between any two of these values or less than any one of these values. However, other amounts are possible. The particular amount depends upon the desired properties of the co-polyester composition. In some embodiments, the metal sulfonated co-polyester includes about 40 wt % to about 90 wt % of the first pre-polymer.

In another embodiment, a second pre-polymer is provided which is produced by the esterification reaction of an aromatic sulfonate or a salt thereof, or ester thereof, with a second alkylene diol. The degree of polymerization of the second pre-polymer can range from 2 to greater than 100. For example, the degree of polymerization of the second pre-polymer can range from about 2 to about 50, about 2 to about 20, or about 2 to about 10, and ranges between and including any two of these values. In some embodiments, the degree of polymerization of the second pre-polymer is from 2 to 5. In some embodiments, the degree of polymerization of the second pre-polymer is from 2 to 20.

The aromatic sulfonate may be terephthalic acid sulfonate, isophthalic acid sulfonate (SIPA), 2,6-naphthalene dicarboxylic acid sulfonate, 3,4'-diphenyl ether dicarboxylic acid sulfonated, hexahydrophthalic acid sulfonate, 2,7-naphthalenedicarboxylic acid sulfonate, phthalic acid sulfonate, or 4,4'-methylenebis(benzoic acid) sulfonate, or a combination of any two or more thereof, or salts thereof. The aromatic sulfonate salt may include an alkali metal salt (Na, K, Li), an alkaline earth metal salt (Mg, Ca), a transition metal salt (Ni, Fe), a phosphonium salt, an ammonium salt, or a combination of any two or more thereof. In some embodiments, the metal is at least one Li, Na, K, Mg, Ca, Ni, and Fe.

Examples of the metal salt of aromatic sulfonate used in the method include, but are not limited to, metal salt of sulfonate terephthalic acid, metal salt of sulfonate isophthalic acid (SIPA), metal salt of sulfonate 2,6-naphthalene dicarboxylic acid, metal salt of sulfonated 3,4'-diphenyl ether dicarboxylic acid, metal salt of sulfonate hexahydrophthalic acid, metal salt of sulfonate 2,7-naphthalenedicarboxylic acid, metal salt of sulfonate phthalic acid and metal salt of sulfonate 4,4'-methylenebis(benzoic acid), and the metal salt of sulfonate aromatic ester is at least one of a metal salt of sulfonate terephthalate, metal salt of sulfonate isophthalate, metal salt of sulfonate 2,6-naphthalene dicarboxylate, metal salt of sulfonated 3,4'-diphenyl ether dicarboxylate, metal salt of sulfonate hexahydrophthalate, metal salt of sulfonate 2,7-naphthalenedicarboxylate, metal salt of sulfonate phthalate and metal salt of sulfonate 4,4'-methylenebis(benzoate).

The second pre-polymer may be added to the sulfonated co-polyester composition at various amounts. In some embodiments, the second pre-polymer is added in an amount of from about 0.01% to about 99% by weight of the total weight of the sulfonated co-polyester. This includes embodiments in which the amount is from about 10% to about 99%, from about 20% to about 95%, from about 30% to about 92%, from about 40% to about 90%, from about 50% to about 80% and from about 60% to about 75% of the total weight of the sulfonated co-polyester, and ranges between any two of these values or less than any one of these values. In some embodiments, the second pre-polymer may constitute from about 0.01 wt %, about 2 wt %, about 5 wt %, about 7 wt %, about 10 wt %, about 20 wt %, about 30 wt %, about 40 wt %, about 50 wt %, about 60 wt %, about 70 wt %, about 80 wt %, about 90.0 wt %, about 95.0 wt %, about 99.0 wt % of the metal sulfonated co-polyester, and ranges between any two of these values or less than any one of these values. However, other amounts are possible. The particular amount depends upon the desired properties of the co-polyester composition. In some embodiments, the metal sulfonated co-polyester includes about 5 wt % to about 30 wt % of the second pre-polymer. In some embodiments, the metal sulfonated co-polyester includes about 5 wt % to about 40 wt % of the second pre-polymer.

The first and the second alkylene diol may include suitable diols known in the art. For example, the alkylene diol may include glycols that have 2 to 20 carbon atoms. The diols may be un-substituted or substituted; straight chain, branched, cyclic aliphatic diol, aliphatic-aromatic diol, aromatic diol, or a combination of any two or more thereof. The diol can also be poly (alkylene ether) glycols with molecular weights between about 250 to about 4,000. Examples of dihydric alcohols include ethylene glycol, 1,3-propanediol, 1,4-butanediol, 1,6-hexanediol, and poly (ethylene ether) glycols. The branched diols include $C_4$-$C_{16}$ aliphatic branched diols. The branched diol may have 4-12 carbon atoms. In some embodiments, the branched diol may have 4-10 carbon atoms. In other embodiments, the branched diol may have 4-8 carbon atoms.

In some embodiments, the alkylene diols include $C_4$-$C_5$ branched aliphatic diols. Examples of branched diols include, but are not limited to, 2-methyl-1,3-propanediol, 2,2-dimethyl-1,3-propanediol, 2-butyl-2-ethyl-1,3-propanediol, trimethylpentanediol, and the like. The diol may be a cycloaliphatic diol having between 6-20 carbon atoms, with the proviso that if a cyclohexane diol is used, it is included with at least one additional cyclic or branched diol. For example, isosorbide or a mixture of (cis, trans) 1,3-cyclohexanedimethanol and (cis, trans) 1,4 cyclohexanedimethanol may be used. Examples of aromatic diol may include xylene glycol, and hydroquinone. In one embodiment the diol may be 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 1,4-cyclohexanedimethanol, di(ethylene glycol), tri(ethylene glycol), poly(ethylene ether) glycols, poly(butylene ether) glycols, 2-methyl-1,3-propanediol, 2,2-dimethyl-1,3-propanediol, 2-butyl-2-ethyl-1,3-propanediol, trimethylpentanediol, isosorbide or a mixture of (cis, trans) 1,3-cyclohexanedimethanol and (cis, trans) 1,4 cyclohexanedimethanol, xylene glycol, or hydroquinone.

The first alkylene diol can be a straight chain or a branched diol having 3 to 12 carbon atoms per molecule. Examples of suitable first diols include, but are not limited to, ethylene glycol, diethylene glycol, propanediol, butanediol, cyclohexanedimethanol, hexane diol, octanediol, decanediol, dodecanediol, or a combination of any two or more thereof. In some embodiments, the first alkylene diol is ethylene glycol.

Examples of suitable second alkylene diols include, but are not limited to, ethylene glycol, diethylene glycol, propanediol, butanediol, cyclohexanedimethanol, hexane diol, octanediol, decanediol, dodecanediol, or a combination of any two or more thereof. In some embodiments, the second alkylene diol is other than ethylene glycol. In some embodiments, the second alkylene diol is butanediol.

In some embodiments, the co-polyester may include a diol component comprising 45 to 75 mole % of ethylene glycol and 5 to 25 mole % of at least one diol other than ethylene glycol based on the total mole % of the diol component.

The second pre-polymer can be prepared using suitable methods known in the art. For example, the aromatic sulfonate, or salt thereof, or ester thereof can be reacted with a second alkylene diol at a suitable temperature and pressure for a sufficient amount of time to obtain the second pre-polymer. Suitable esterification conditions can be employed for the preparation of the second pre-polymer. For example, the reaction can be conducted at a temperature of about 300° C. or below. This may include a temperature of about 200° C. or below, about 100° C. or below, at about 80° C. or below, at about 50° C. or below, at about 45° C. or below, at about 40° C. or below, at about 35° C. or below, at about 30° C. or below, at about 25° C. or below or at about 20° C. or below, and ranges between and including any two of these values. The reaction may be conducted for a pressure of about 1 bar to about 30 bars, about 2 bars to about 20 bars, about 3 bars to about 10 bars, about 4 bars to about 5 bars, and ranges between and including any two of these values. In some embodiments, the reaction pressure is up to about 20 bars, up to about 10 bars, up to about 5 bars, up to about 3 bars, up to about 2 bars, up to about 1 bar, and ranges between and including any two of these values. The reaction can be conducted for a period of about 1 min to about 60 min, about 1 h to about 5 h, about 5 h to about 8 h, about 8 h to about 15 h, about 15 h to about 25 h, about 25 h to about 40 h, and ranges between and including any two of these values. In some embodiments, the reaction of an aromatic sulfonate, salt thereof or an ester thereof with an alkylene diol is conducted at a temperature ranging from about 160° C. to about 195° C. at a pressure of up to about 4 bars for a period of about 2 h to about 3 h. In some embodiments, the reaction of an aromatic sulfonate, salt thereof or an ester thereof with an alkylene diol is conducted at a temperature ranging from about 160° C. to about 215° C. at a pressure of up to about 4 bars for a period of about 2 h to about 3 h.

The sulfonated co-polyester may be produced by suitable polymerization techniques known in the art. For example, the first pre-polymer and the second pre-polymer may be polymerized using suitable polycondensation techniques known in the art. In some embodiments, the sulfonated co-polyester is produced by any of the conventional melt or solid state polycondensation techniques. The melt polycondensation method can be carried out in either batch, semi-continuous or continuous mode. The method is best carried out in a reactor equipped with a distillation column and a stirrer or other means for agitation. The distillation column separates the volatile product of reaction (water and/or alkanol) from volatile reactants (e.g., ethylene glycol). Use of a distillation column allows for operation at a lower molar ratio of ethylene glycol to terephthalic acid, which serves to suppress the formation of DEG. Melt polycondensation can be carried out in conventional method like PTA, DMT and PCR PET glycolysis. When terephthalic acid is used in the polymerization method, the volatile reaction product will be water; when an ester such as dimethyl terephthalate is used, the volatile reaction product will be the corresponding alkanol (such as methanol), together with smaller amounts of water. Continuous polymerization method may be used to prepare polyesters.

In some embodiments, the method includes reacting the metal sulfonate co-polymer reacted with a fast crystallizing polymer block, e.g., a fast crystallizing polyester block, to provide an amorphous sulfonated co-polyester. The fast crystallizing polyester may be added at the any stage co-polyester synthesis method. For example, it may be added at the end of esterification or before end of polycondensation reaction. In one embodiment, the fast crystallizing polyester is added at end of polycondensation. In some embodiments, the fast crystallizing polyester can be added at least one stage that is before, during and after the polymerization reaction. In some embodiments, the fast crystallizing polyester has a degree of polymerization that can range from 2 to greater than 100. For example, the degree of polymerization can range from at least about 5, at least about 10, at least about 20, at least about 25, at least about 30, at least about 40, or at least about 50, and ranges between and including any two of these values. In some embodiments, the fast crystallizing polyester has a degree of polymerization of at least about 20. In some embodiments, the fast crystallizing polyester has a degree of polymerization of greater than about 50.

Suitable fast crystallizing polymers are known in the art and include, but are not limited to, polybutylene terephthalate (PBT), polypropylene terephthalate (PTT), polybutylene naphthalate (PBN), fast crystallizing polyester, polypropylene naphthalate (PTN) or a combination of any two or more thereof. The fast crystallizing polyester present in the sulfonated co-polyester product is obtained from the polymerization reaction of at least one aromatic or aliphatic dicarboxylic acid or ester thereof and alkylene diol. The aromatic dicarboxylic acid useful for obtaining the fast crystallizing polyester is terephthalic acid, isophthalic acid, 2,6-naphthalene dicarboxylic acid, 3,4'-diphenyl ether dicarboxylic acid, hexahydrophthalic acid, 2,7-naphthalenedicarboxylic acid, phthalic acid or 4,4'-methylenebis(benzoic acid), whereas the ester of aromatic dicarboxylic acid that can be used for obtaining the polyester is dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate, or dimethyl-4,4'-methylenebis(benzoate), or combinations of any two or more thereof. The alkylenediol is ethylene glycol, propanediol, butanediol, cyclohexanedimethanol, and hexane diol, or a combination of any two or more thereof.

The fast crystallizing polyester is added to the sulfonated co-polyester composition at various amounts. In some embodiments, the fast crystallizing polyester is added in an amount ranging from about 0.01% to about 99% by weight of the total weight of the sulfonated co-polyester. This includes embodiments in which the amount ranges from about 10% to about 99%, from about 20% to about 95%, from about 30% to about 92%, from about 40% to about 90%, from about 50% to about 80% and from about 60% to about 75% of the total weight of the co-polyester composition, and ranges between any two of these values or less than any one of these values. In some embodiments, the fast crystallizing polyester may constitute from about 0.01 wt %, about 10 wt %, about 20 wt %, about 30 wt %, about 40 wt %, about 50 wt %, about 60 wt %, about 70 wt %, about 80 wt %, about 90.0 wt %, about 95.0 wt %, about 99.0 wt %, and ranges between any two of these values or less than any one of these values. However, other amounts are possible. In some embodiments, the fast crystallizing polyester is added in an amount of about 0 wt % to about 30 wt % of the total weight of the co-polyester. In some embodiments, the fast crystallizing polyester is added in an amount of about 1 wt % to about 30 wt % of the total weight of the co-polyester. In some embodiments, the fast crystallizing polyester is added in an amount of about 5 wt % to about 30 wt % of the total weight of the co-polyester. In other embodiments, the fast crystallizing polyester is added in an amount of about 5 wt % to about 25 wt % of the total weight of the co-polyester. In one embodiment, the co-polyester includes about 15 to about 30 wt % of at least one fast crystallizing polyester. In another embodiment, the co-polyester includes about 10 to about 25 wt % of at least one fast crystallizing polyester.

In one aspect, the first pre-polymer, the second pre-polymer and the fast crystallizing polyester are connected to each other through ester linkage.

In one aspect, the method further includes crystallizing the amorphous sulfonated co-polyester to form a crystallized sulfonated co-polyester. Suitable crystallization techniques known in the art may be used to produce the crystallized sulfonated co-polyester. The crystallization reaction can be conducted by heating the amorphous co-polyester at a suitable temperature for a suitable period of time. For example, the crystallization can be conducted at a temperature of about 10° C. to about 300° C., about 30° C. to about 200° C., about 50° C. to about 250° C. about 80° C. to about 200° C. and about 100° C. to about 150° C., and ranges between and including any two of these values. In some embodiments, the amorphous sulfonated co-polyester is crystallized at a temperature in the range of about 110° C. to about 150° C. to produce a crystallized sulfonated co-polyester.

The reaction of producing the first pre-polymer and/or the second pre-polymer may further include addition of one or more additives. In some embodiments, the additive is a nucleating agent, branching agent, chain extender, antioxidant, plasticizers, stabilizing agent, a coloring agent, or other additives. Additives may also be added before or during or after the polymerization reaction to impart requisite property to the resulting co-polyester. Such additives include but are not limited to dyes; pigments; flame retardant additives such as decabromodiphenyl ether and triarylphosphates, such as triphenylphosphate; reinforcing agents such as glass fibers; thermal stabilizers; ultraviolet light stabilizers methoding aids, impact modifiers, flow enhancing additives, ionomers, liquid crystal polymers, fluoropolymers, olefins including cyclic olefins, polyamides and ethylene vinyl acetate copolymers.

The additives described herein, for example, the plasticizer, anti-oxidizing agent, stabilizing agent, and end-capped oligomer, if present, can be incorporated for example, at a concentration of about 0.001 wt %, about 0.01 wt %, about 0.02 wt %, about 0.05 wt %, about 0.1 wt %, about 0.5 wt %, about 1.0 wt %, about 2 wt %, about 5 wt %, about 10.0 wt %, about 15.0 wt %, about 20.0 wt %, about 30.0 wt %, and ranges between any two of these values or less than any one of these values. Other additives, such as for example, nucleating agent and the branching agent, if present, can be incorporated for example, at a concentration from about 0.1 ppm to about 10,000 ppm, about 2 ppm to about 5000 ppm, about 5 ppm to about 7500 ppm, about 10 ppm to about 2000 ppm, about 20 ppm to about 1000 ppm, or about 50 ppm to about 500 ppm, and ranges between any two of these values or less than any one of these values.

In one aspect, a co-polyester obtained by the methods described herein is provided, wherein the co-polyester includes 40 wt % to 90 wt % of the first pre-polymer having degree of polymerization≥4, inclusive, 5 wt % to 30 wt % of the second pre-polymer having a degree of polymerization 2, inclusive, 5 wt % to 30 wt % of the fast crystallizing polyester having degree of polymerization greater than 20, and one or more of a liquid plasticizer, a nucleating agent, a branching agent, an anti-oxidizing agent, and a stabilizing agent.

Examples of additives include, but are not limited to, a liquid plasticizer, a nucleating agent, a branching agent, an anti-oxidizing agent, a stabilizing agent, and an end-capped oligomer. In some embodiments, the additive may be a branching agent in an amount of 10 ppm to 2000 ppm, a nucleating agent in an amount of 10 ppm to 2000 ppm, a liquid plasticizer in an amount of 0.5 to 2 wt %, and at least one anti-oxidizing agent in an amount ranging from 0.1 to 5%. Other agents useful for the purpose of the present disclosure include at least one end-capped oligomer in an amount from 1 to 20 wt %.

The branching agent may be, but is not limited to, 1,2,4-benzenetricarboxylic acid (trimellitic acid); trimethyl-1,2,4-benzenetricarboxylate; 1,2,4-benzenetricarboxylic anhydride (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol; 2,2-bis(hydroxymethyl) propionic acid; sorbitol; glycerol; or a combination of any two or more thereof. Particularly, branching agents may include pentaerythritol, trimellitic acid, trimellitic anhydride, pyromellitic acid, pyromellitic anhydride and sorbitol.

It is believed that the nucleating agent improves the crystallinity and increases heat deformation temperature of the polyester product. The nucleating agent can be organic or inorganic. Examples of inorganic nucleating agent include, but are not limited to, calcium silicate, nano silica powder, talc, microtalc, aclyn, kaolinite, montmorillonite, synthetic mica, calcium sulfide, boron nitride, barium sulfate, aluminum oxide, neodymium oxide, or a metal salt of phenyl phosphonate. The inorganic nucleating agent can be modified by an organic material to improve its dispersibility in the polyester product of the present disclosure.

Examples of organic nucleating agent include, but are not limited to, carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate and sodium cyclohexane carboxylate; organic sulfonates such as sodium p-toluene sulfonate and sodium sulfoisophthalate; carboxylic acid amides such as stearic acid amide, ethylene bis-lauric acid amide, palmitic acid amide, hydroxystearic acid amide, erucic acid amide and tris(t-butylamide) trimesate; phosphoric compound metal salts such as benzylidene sorbitol and derivatives thereof, sodium-2,2'-methylenebis(4,6-di-t-butylphenyl)phosphate, and 2,2-methylbis(4,6-di-t-butylphenyl)sodium, and the like, or a combination of any two or more thereof.

Examples of liquid plasticizers include, but are not limited to, N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl-N-ethyl benzene sulfonamide, N-methyl-N-propyl benzene sulfonamide, N-ethyl-N-propyl benzene sulfonamide, N-ethyl-p-ethylbenzenesulfonamide, N-ethyl-p-(t-butyl)benzene sulfonamide, N-butyl-p-butyl benzene sulfonamide, N-butyl toluene sulfonamide, N-t-octyl toluene sulfonamide, N-ethyl-N-2-ethylhexyl toluene sulfonamide, N-ethyl-N-t-octyl toluene sulfonamide and tri-octyltrimellitate, and the like, or a combination of any two or more thereof.

Examples of anti-oxidizing agent include, but are not limited to, Irganox® 1010, Irganox® 1076, Irgafos® 126 and Irgafos® 168. Similarly, copper nitrate (up to 150 ppm) along with potassium iodide, potassium bromides (up to 1000 ppm), or any other Light & UV Stabilizers which can be added to enhance weatherability of the polymers.

Examples of stabilizing agent include, but are not limited to, ortho-phosphoric acid, trimethylphosphate (TMP), triphynylphosphate (TPP), or triethylphosphono acetate (TEPA). In some embodiments, an ortho-phosphoric acid is used as stabilizing agent.

Examples of end-capped oligomers include, but are not limited to, oligomers of polyethylene terephthalate, polybutylene terephthalate, polytrimethylene terephthalate, polytrimethylenenaphthalate and polybutylenenaphthalate, and the like, or a combination of any two or more thereof.

The methods and products described herein may include other suitable additives known in the art such as, but not limited to, pigments, flame retardant additives such as decabromodiphenyl ether and triarylphosphates, such as triphenylphosphate, reinforcing agents such as glass fibers, thermal stabilizers, ultraviolet light stabilizers methoding aids, impact modifiers, flow enhancing additives, ionomers, liquid crystal polymers, fluoropolymers, olefins including cyclic olefins, polyamides, and ethylene vinyl acetate copolymers.

In one embodiment, the methods also include subjecting the crystallized co-polymer to solid state polymerization conditions. Such action increases the molecular weight and the intrinsic viscosity of the co-polymer. The solid state polymerization is conducted under a vacuum or in the presence of a stream of an inert gas. Suitable inert gases include, but are not limited to, nitrogen, carbon dioxide, helium, argon, neon, krypton, xenon, and the like. Suitable solid state polymerization temperatures can range from a temperature at or above the polymerization reaction temperature up to a temperature below their melting point. For example, the solid state polymerization reaction can be conducted at a temperature of about 400° C. or below, about 300° C. or below, about 200° C. or below, about 100° C. or below, at about 80° C. or below, at about 50° C. or below, at about 45° C. or below, at about 40° C. or below, at about 35° C. or below, at about 30° C. or below, at about 25° C. or below or at about 20° C. or below, and ranges between and including any two of these values. In some embodiments, the solid state polymerization is conducted at a temperature of about 50° C. to about 400° C., about 80° C. to about 350° C., about 100° C. to about 300° C., about 150° C. to about 250° C., about 180° C. to about 200° C., and ranges between and including any two of these values. The co-polyester can be solid state polymerized for a time sufficient to increase its molecular weight or IV to the desired value. For example, the solid state polymerization reaction can be conducted for a period of about 1 min to about 60 min, about 1 h to about 5 h, about 5 h to about 8 h, about 8 h to about 15 h, about 15 h to about 25 h, about 25 h to about 40 h, and ranges between and including any two of these values.

In one embodiment, the crystallized co-polyester is subjected to solid state polymerization by placing the pelletized or pulverized polymer into a tumble drier of an inert gas, such as nitrogen, or under a vacuum of 1 torr, at an elevated temperature, above 150° C. but below the melting temperature, for a period of about 4 to about 16 hours. In some embodiments, the solid state polymerization is carried out at a temperature of about 180° C. to about 200° C. which results in an increase in inherent viscosity to about 0.5 dl/g.

The methods described herein can be modified to provide co-polyesters with desired properties such as molecular weight, oligomer content and inherent viscosity. In some embodiments, the intrinsic viscosity of the co-polyester is at least 0.250 dL/g. In one embodiment, the co-polyester, after solid state polymerization, has an inherent viscosity of at least 0.250 dL/g and oligomer content less than 1.2 wt %, preferably less than 1.0 wt % and more preferably less than 0.5%. In spite of having a high wt % of sulfonated residue, the co-polyester described herein can be crystallized by SSP. The co-polyester is insoluble in water. Thus, water may be used while cutting the granules in the casting method. Furthermore the co-polyester has enough melt strength to blend with various high intrinsic viscosity polyester or polyamides.

In one embodiment, a method of preparing the co-polyester is provided wherein the method includes contacting a dicarboxylic acid component having about 45 to about 95 mole % of terephthalic acid residue, and up to about 15 mole % of at least one dicarboxylic acid residue other than terephthalic acid, with a diol component having about 45 to about 75 mole % of ethylene glycol and up to about 25 mole % of at least one diol other than ethylene glycol, at a temperature in the range of about 240° C. to about 260° C. at a pressure up to about 4 bar for about 2 to about 3 h to form an ester intermediate; contacting a sulfonated component comprising about 5 to about 40 mole % of a residue that is a sulfonated hydroxyl terminated monomer or sulfonated carboxyl terminated monomer based on the total mole % of acid or alcohol with the ester intermediate to obtain a reaction mixture; subjecting the reaction mixture to a pressure in the range of about 400 to about 500 torr at a temperature in the range of about 240 to about 260° C. for up to about 30 min to obtain a pre-polymer; subjecting the pre-polymer to polycondensation in presence of phosphoric acid at a temperature in the range of about 280 to about 290° C. at a pressure of less than about 0.2 mbar for about 2 to about 3 h to obtain a polymer; contacting the polymer with up to about 30 wt % of at least one fast crystallizing polyester to obtain a melt polyester; crystallizing the melt polyester at a temperature in the range of about 110° C. to about 150° C. to produce a crystallized polyester; and heating the crystallized polyester under vacuum at a temperature in the range of about 150° C. to about 195° C. for about 10 to about 20 h for solid state polymerization. The co-polyester exhibits an inherent viscosity of at least about 0.25 dL/g and less than about 1.0 wt % oligomer content after up gradation of intrinsic viscosity in solid state polymerization.

The co-polyester can be prepared by treating equal molar proportions of dicarboxylic acid residues (100 mole %) and diol residues (100 mole %) to form repeating units (100 mole %). The mole percentages provided in the present disclosure, therefore, may be based on the total moles of acid residues, the total moles of diol residues, or the total moles of repeating units. For example, a sulfonated component containing 35 mole % of a residue of a sulfonated hydroxyl terminated monomer and a sulfonated carboxyl terminated monomer based on the total mole % of acid or alcohol, means that the polyester contains 30 mole % the sulfonated component out of a total of 100 mole % diacid, diol, or the repeating unit. Thus, there are 30 moles of sulfonated component among every 100 moles of repeating units. Similarly, block polymer containing 35 mole % of a sulfonated component based on the total acid residues contains 35 mole % sulfonated component out of a total of 100 mole % acid residues.

In one aspect, provided is a modified co-polyester produced by the any of the above. The co-polyester is capable of improving the dyeing affinity of the polyesters such as PET and the stain and soil resistance of the polyamides. The modified co-polyester includes at least one metal sulfonated copolymer block and is crystallizable and can be upgraded by solid state polymerization to achieve the desired molecular weight and intrinsic viscosity and to reduce oligomer content. In some embodiments, the co-polyester includes a sulfonated co-polymer comprising of a sulfonated component including 5 to 40 mole % of a residue that is sulfonated hydroxyl terminated monomer or sulfonated carboxyl terminated monomer based on the total mole % of acid or alcohol. In another embodiment, the co-polyester includes a co-polymer comprising a sulfonated component including 15 to 35 mole % of a residue that is sulfonated hydroxyl terminated monomer or sulfonated carboxyl terminated monomer based on the total mole % of acid or alcohol.

In one aspect, provided is a co-polyester obtained by the method described herein. The co-polyester includes 40 to 90% of a first pre-polymer having degree of polymerization between 4 to 10, comprising alkylene aryl dicarboxylate derived from one or more aromatic dicarboxylic acid or ester thereof and one or more alkylene diol; 5 to 30 wt % of a second pre-polymer having degree of polymerization between 2 to 5, which includes metal sulfonate polyester obtained from at least one metal sulfonated aromatic dicarboxylic acid or ester thereof and ethylene glycol; 5 to 30 wt % of one or more fast crystallizing polyester block having degree of polymerization greater than 20; one or more of a liquid plasticizer in an amount of 0.5 to 2 wt %; at least one nucleating agent in an amount of 10 ppm to 2000 ppm; at least one branching agent in an amount of 10 ppm to 2000 ppm; at least one anti-oxidizing agent in an amount ranging from 0.1 to 5 wt %; at least one stabilizing agent; at least one additive, or optionally, at least one end-capped oligomer in an amount of 1 to 20 wt %. The co-polyester is characterized by at least one of the following properties: intrinsic viscosity greater than 0.25 dL/g; oligomer content less than 1.2 wt %; diethylene content less than 0.5 wt %; carboxylic end group less than 50 meq/kg, crystallinity greater than 25%; and sulfonated salt content greater than 15%.

In one aspect, the method further includes melt blending the sulfonated co-polyester with a nylon or a polyester, extruding a filament, and spinning the filament into a fiber or yarn. The sulfonated co-polyester can be melt-blended with a nylon or a polyester in suitable amounts to obtain the sulfonated polyester or polyamide composition with desired properties. Suitable melt blending conditions are known in the art. Generally, up 25 wt % of the sulfonated co-polyester or masterbatch thereof is blended in polyester to enhance its dying affinity to cationic dyes, and up to 30 wt % of sulfonated co-polyester is blended with nylon to improve the stain resistance.

In one aspect, provided are a sulfonated co-polyester and products thereof, wherein the co-polyester includes: at least 70 wt % of sulfonated copolymer, and at least 30 wt % of a fast crystallizing polyester, wherein the co-copolymer includes a dicarboxylic acid component comprising 45 to 95 mole % of terephthalic acid residue and up to 15 mole % of at least one dicarboxylic acid residue other than terephthalic acid; a sulfonated component comprising 5 to 40 mole % of a residue that is sulfonated hydroxyl terminated monomer or sulfonated carboxyl terminated monomer based on the total mole % of acid or alcohol; or a alkylene diol component comprising 45 to 75 mole % of ethylene glycol and up to 25 mole % of at least one alkylene diol other than ethylene glycol. The co-polyester has an inherent viscosity of at least 0.250 dL/g and lower oligomer content less than 1.2 wt % after up-grading of the intrinsic viscosity in solid state polymerization. In one embodiment, the inherent viscosity of the polyester is in the range of 0.30 to 0.50 dL/g and crystallinity is greater 25%. The sulfonated co-polyesters can be extruded and/or molded to fibers and other articles. The fibers obtained from blending of the sulfonated co-polyester and polyester (PET) have superior cationic dyeable property. The fibers obtained from blending of sulfonated co-polyester and nylons have improved stain resistance.

In one aspect, provided are modified sulfonated co-polyesters which can be used in fiber or yarn applications. The sulfonated co-polyester includes at least one polyester; at least one sulfonated co-polymer and at least one fast crystallizing polyester and optionally one or more additives. The sulfonated copolymer present in the sulfonated co-polyester product is obtained from the polymerization reaction of at least one sulfonated dicarboxylic acid or ester thereof and alkylene diol.

The sulfonated dicarboxylic acid useful for obtaining the sulfonated copolymer include, but are not limited to sulfonated terephthalic acid, sulfonated isophthalic acid (Na-SIPA), sulfonated 2,6-naphthalene dicarboxylic acid (Na-DIMSIP), sulfonated 3,4'-diphenyl ether dicarboxylic acid, sulfonated hexahydrophthalic acid, sulfonated 2,7-naphthalenedicarboxylic acid, sulfonated phthalic acid and sulfonated 4,4'-methylenebis(benzoic acid), whereas the ester of sulfonated aromatic dicarboxylic acid that can be used for obtaining the sulfonated copolymer is dimethyl sulfonated terephthalate, dimethyl sulfonated isophthalate (DIMSIP), sulfonated dimethyl-2,6-naphthalate, sulfonated dimethyl-3, 4'-diphenyl ether dicarboxylate, sulfonated dimethyl hexahydrophthalate, sulfonated dimethyl-2,7-naphthalate, sulfonated dimethyl phthalate, or sulfonated dimethyl-4,4'-methylenebis(benzoate). The alkylenediol used for obtaining the sulfonated copolymer include, but are not limited to, ethylene glycol, propanediol, butanediol, cyclohexanedimethanol, hexane diol or a combination of any two or more thereof. Suitable additives useful for obtaining the sulfonated copolymer include, but are not limited to, nucleating agent, branching agent, chain extender, antioxidant, plasticizers, stabilizing agent etc.

In one aspect, provided is a crystallizable sulfonated polyester masterbatch containing greater than about 15 wt % sulfonated salt so that it can be upgraded in solid state polymerization to required I.V. level and lower oligomer contents less than 1.2 wt %, preferably below 0.5 wt %, most preferably 0.25 wt %.

In one embodiment, a sulfonated co-polyester product for use in fiber and yarn manufacturing is provided, said co-polyester product characterized by at least one of the following properties: PET equivalent I.V. up to 1.2 dL/g; oligomer content less than 1.5 wt %.; diethylene content less than 1.5 wt %; carboxylic end group less than 100 meq/kg; crystallinity greater than 20%; and sulfonated salt content greater than 15 wt %. In some embodiments, a blend of the sulfonated co-polyester with polyethylene terephthalate exhibits a greater cationic dyeing affinity than a non-blended polyethylene terephthalate. In other embodiments, a blend of the sulfonated co-polyester with a nylon exhibits improved, low temperature stain resistance compared a non-blended nylon.

In some embodiments, the co-polyester exhibits superior cationic dyeing affinity to polyester (PET) and improved stain resistance to nylons at low temperature. The co-polyester can be made by the melt condensation method described above to have an inherent viscosity of at least about 0.25 dl/g, and often as high as about 0.35 dl/g or greater, without further treatment. The product made by melt polymerization, after extruding, cooling, and pelletizing, is in amorphous state (non-crystalline). The product can be made semi-crystalline by heating it to a temperature in the range of about 110° C. to about 150° C. for an extended period of time (about 4 hours to about 8 hours). This induces crystallization so that the product can then be heated up to below melting temperature of polyester to raise the molecular weight and obtain the desired intrinsic viscosity.

In some embodiments, a crystallizable sulfonated co-polyester masterbatch is provided which contains sulfonated salt content equal or greater than 15 wt % having a polyethylene terephthalate equivalent intrinsic viscosity of up to 1.2 dL/g. The masterbatch can be further combined with polyester or polyamide compositions. In some embodiments, the co-polyester is upgraded in solid state polymerization to desired PET equivalent intrinsic viscosity up to 1.2 dL/g. In some embodiments, the sulfonated polyester has an oligomer content of less than about 0.5 wt %. The present invention also provides methods to manufacture of a co-polyester ionomer with melt viscosity at least 8000 P and low oligomer contents. The methods provide a sulfonated co-polyester with beneficial properties such as for example, desired intrinsic viscosity and molecular weight, improved crystallinity (e.g., at least 25% crystallinity), lower oligomer content (e.g. less than 1.2 wt %) and lower carboxylic end group content (e.g., less than 50 meq/kg). The sulfonated co-polyester can be employed in extrusion and molding applications. The sulfonated co-polyester can be melt blended and/or extruded with polyethylene terphthalate (PET) to improve its cationic dyeability. The sulfonated co-polyester can be melt blended and/or extruded with nylon to improve its stain and soil resistance. The sulfonated co-polyester product can be used in amount ranging from about 10 wt % to about 20 wt % with fiber forming thermoplastics including but not limited to polyesters (such as PET, PBT, PTT) and polyamides (nylon-6, nylon-66 etc.).

In some embodiments, a crystallizable sulfonated co-polyester masterbatch is provided, which includes ≥15 wt % of a sulfonated salt. In some embodiments, a crystallizable sulfonated co-polyester masterbatch is provided, which includes ≥15 wt % of a sulfonated salt having a polyethylene terephthalate equivalent intrinsic viscosity of up to 1.2 dL/g. In some embodiments, the crystallizable sulfonated co-polyester has an oligomer content of less than about 0.5 wt %. In some embodiments, a crystallizable sulfonated co-polyester masterbatch is provided, which includes ≥15 wt % of sulfonated salt; and oligomer contents less than 1.5 wt % of the sulfonated co-polyester. In some embodiments, the crystallizable sulfonated co-polyester acts as a compatibilizer between polyester or nylon. In some embodiments, the crystallizable sulfonated co-polyester includes a compatibilizer up to 10 wt % of the total composition based on polyester or nylon.

In another aspect, provided are methods of preparing colored polyester or polyamide fibers, wherein the method includes melt blending a polyester or a polyamide resin, a coloring agent, and a crystallized sulfonated co-polyester, wherein the crystallized sulfonated co-polyester exhibits at least one of: an intrinsic viscosity greater than 0.25 dL/g; an oligomer content of less than 0.5 wt %; a diethylene content of less than 0.5 wt %; a carboxylic end group content of less than 50 meq/kg; a crystallinity greater than 25%; and a sulfonated salt content greater than or equal to 15 wt %.

Suitable coloring agents for use in fibers are known in the art and may include, but are not limited to dyes, inorganic or organic pigments, or mixtures of these. In some embodiments, the coloring agents include dyes such as, but not limited to, azo, azomethine, methine, anthraquinone, phthalocyanine, dioxazine, flavanthrone, indanthrone, anthrapyrimidine, or metal complex dyes. In one embodiment the coloring agent is a metal oxide, mixed metal oxide, metal sulfide, zinc ferrite, sodium alumino sulfo-silicate pigment, carbon black, phthalocyanine, quinacridone, nickel azo compound, mono azo coloring agent, anthraquinone, or perylene. In some embodiments, the coloring agent is Solvent Blue 132, Solvent Yellow 21, Solvent Red 225, Solvent Red 214 and Solvent Violet 46, Carbon Black, Titanium Dioxide, Zinc Sulfide, Zinc Oxide, Ultramarine Blue, Cobalt Aluminate, Iron Oxides, Pigment Blue 15, Pigment Blue 60, Pigment Brown 24, Pigment Red 122, Pigment Red 147, Pigment Red 149, Pigment Red 177, Pigment Red 178, Pigment Red 179, Pigment Red 202, Pigment Red 272, Pigment Violet 19, Pigment Violet 29, Pigment Green 7, Pigment Yellow 119, Pigment Yellow 147 and Pigment Yellow 150, or a combination of any two or more thereof.

Depending on the desired color, any number of different coloring agents in varying proportions may be used. In some embodiments, the coloring agent may constitute from about 0.001 wt %, about 0.01 wt %, about 0.1 wt %, about 0.5 wt %, about 1 wt %, about 2 wt %, about 5 wt %, about 8 wt %, about 10 wt %, about 15 wt %, about 20 wt %, about 25 wt %, about 30 wt %, about 40 wt %, about 50 wt % of the total composition, and ranges between any two of these values or less than any one of these values. However, other amounts are possible. The particular amount depends upon the desired color of the fiber composition. In some embodiments, the composition includes about 0.01 wt % to about 10 wt % of the coloring agent.

The coloring agent can be added at any time during the process. For example, the coloring agent is added during the formation of the first pre-polymer, the second pre-polymer or during or after the polymerization reaction. In some embodiments, the coloring agent can be first combined with the first pre-polymer, the second pre-polymer, the fast-crystallizing polymer, the sulfonated co-polyester, the polyester or the polyamide or a mixture thereof to form a color concentrate which can be subsequently used in the fiber forming process. In some embodiments, the coloring agent can be added during or after the fiber forming process. In some embodiments, the coloring agent can be used to dye the uncolored textile or fiber product.

In some embodiments, the co-polyester is utilized for making colored and deep shades of fabric or yarns, and plastic components. In some embodiments, the co-polyester is utilized for making deep and bright colored fibers by using at least one extrusion and spinning method such as e.g., heat set blow molding or cold set blow molding. The coloring of fibers is generally done either by blending polyester or nylon with colorant (also known as solution dyeing) and then extruding or spinning; or first making white yarn and subjecting them to dyeing; or first making fabrics, carpets, etc. and then subjecting them to dying. The sulfonated co-polyesters described herein can be used but not limited to textile applications such as preparing fibers, yarns, etc. The material obtained from use of the sulfonated co-polyester exhibits superior dyeing affinity to reactive basic dye stuffs, coloring agent or pigments, and also exhibits good stain resistance property when it is blended with nylon while producing fibers.

The methods and modified co-polyester compositions described herein exhibit several advantages over those made by other known methods. Such advantages include, but are not limited to, producing sulfonated co-polyesters with improved mechanical and rheological properties, low oligomer content, low intrinsic viscosity, higher sulfonate salt content, imparts improved dyeing affinity to polyester, imparts improved stain resistance, and soil resistance to polyamides.

The modified co-polyester and polymer compositions described herein can be utilized for various applications. Typical end-use applications include, but are not limited to, extruded and non-extruded fibers and yarns for various applications such as for example, apparel fabric, drapery, upholstery, wall coverings, heavy industrial fabrics, ropes, cords, shoe laces, nettings, carpets, and rugs.

The present invention, thus generally described, will be understood more readily by reference to the following examples, which are provided by way of illustration and are not intended to be limiting of the present invention.

EXAMPLES

In the examples below as well as throughout the application, the following abbreviations have the following meanings. If not defined, the terms have their generally accepted meanings.
PET: Polyethylene terephthalate,
PTA: Purified terephthalic acid,
PCR: Post-consumer recycled,
MEG: Mono ethylene glycol,
DEG: Diethylene glycol,
SIPA: 5-Sulfoisophthalic acid,
DMSIP: Dimethyl-5-sulfoisophthalate,
N.A.: Nucleating Agent,
PBT: Polybutylene terephthalate,
PTN: Polytrimethylene terephthalate,
NaSIPA: 5-Sulfoisophthalic acid sodium salt,
NaDMSIP: Dimethyl-5-Sulfoisophthalate sodium salt,
SSP: Solid state polymerization,
dl/gm: deciliters per gram,
meg/kg: milliequivalents/kilogram,
wt %: weight percentage,
I.V.: intrinsic viscosity,
$T_g$: glass transition temperature,
$T_{ch}$: crystallization temperature,
$T_m$: melting temperature
Intrinsic Viscosity Intrinsic viscosity (I.V.) is a measure of the molecular mass of the polymer and is measured by dilute solution using an Ubbelohde viscometer. All intrinsic viscosities are measured in a 60:40 mixture of phenol and s-tetrachloroethane with 0.5% concentration. The flow time of solvent and solution are checked under I.V. water bath maintained 25° C. The I.V., η, was obtained from the measurement of relative viscosity, ηr, for a single polymer concentration by using the Billmeyer equation:

$$IV=[\eta]=0.25[(RV-1)+3 \ln RV]/c$$

Wherein η is the intrinsic viscosity, RV is the relative viscosity; and c is the concentration of the polymeric solution (in g/dL). The relative viscosity (RV) is obtained from the ratio between the flow times of the solution (t) and the flow time of the pure solvent mixture ($t_0$).

$$RV=n_{rel}=\text{Flow time of solution}(t)/\text{Flow time of solvent}(t_0)$$

I.V. must be controlled so that process ability and end properties of a polymer remain in the desired range. Class 'A' certified burette being used for IV measurement for more accuracy.

Color

The color parameters were measured with a Hunter Lab Ultrascan VIS instrument. D65 illuminant and 10° angle is being used for color measurement. Both Amorphous and Solid state polymerized chips (SSP) were used to check by reflectance mode of Hunter colorscan. Generally, the changes measured could also be seen by eye. The color of the transparent amorphous/SSP chips was categorized using the Hunter Scale (L/a/b) & CIE Scale (L*/a*/b*) values which are based on the Opponent-Color theory. This theory assumes that the receptors in the human eye perceive color as the following pairs of opposites.
L/L* scale: Light vs. dark where a low number (0-50) indicates dark and a high number (51-100) indicates light.

a/a* scale: Red vs. green where a positive number indicates red and a negative number indicates green.

b/b* scale: Yellow vs. blue where a positive number indicates yellow and a negative number indicates blue.

The L* values after SSP are higher because of whitening caused by spherulitic crystallization of the polymer.

DEG/EG/IPA/BDO content:

To determine the Diethylene Glycol (DEG), Ethylene Glycol (EG), Isophthalic Acid (IPA) and Butanediol (BDO) in sulfonated co-polyesters, Polymer sample is trans-esterified with methanol in an autoclave at 200° C. for 2.5 hours with zinc acetate as a catalyst.

During methanolysis, the polymer sample is depolymerized and the liquid is filter through Whatman 42 filter paper. After filtration, 1 micro liter of the liquid was injected in Agilent Gas Chromatography (GC) under controlled GC configuration. Based on the RT (Retention Time), DEG/EG/IPA/BDO are calculated with internal standard ISTD (tetraethylene glycol dimethyl ether) and results are declared as wt %.

COOH End Groups:

The Polymer was dissolved in a mixture of phenol and chloroform (50:50 w/v) under reflux conditions. After cooling to room temperature, the COOH end groups were determined using titration against 0.025 N Benzyl alcoholic KOH solution with bromophenol blue as an indicator. Run a blank simultaneously along with sample and the final end point is at the color change from blue from yellow. COOH groups are calculated based on the below calculation and the results are expressed in meq of COOH/kg. In the equation, TR is the volume of benzyl alcoholic KOH consumed for the sample, N is the normality of benzyl alcoholic KOH, and the blank is the volume of benzyl alcoholic KOH consumed for sample solution.

$$[(TR-Blank) \times N \times 1000] = COOH\ end\ groups(meq/kg)$$

DSC Analysis

The Differential Scanning calorimeter is a thermal analyzer which can accurately and quickly determine the thermal behavior of Polymers such as glass transition temperatures (Tg), crystallization exothermic peak temperatures (Tch), peak endotherm temperatures (Tm), heats of crystallization ($\Delta H$) and heats of fusion for all materials. A Perkin-Elmer model Jade DSC was used to monitor thermal properties of all polymer samples at heating and cooling rates of 10° C. per minute. A nitrogen purge was utilized to prevent oxidation degradation.

Crystallinity by DSC and DGC:

The Differential Scanning calorimeter (DSC) and Density Gradient Column (DGC) are used to calculate the crystallinity of polymer samples.

By DSC, the crystallinity is calculated by heat of fusion (($\Delta H$) of Tm1 (Heat 1 cycle) with specific heat of polymer.

By DGC (Density Gradient Column), the crystallinity is calculated with the help of known standard balls floating at the Lloyds densitometer.

Sulfonated Salt Content:

To determine the sulfur content in polymer sample, the sample is fused with sodium hydroxide pellets in a nickel crucible, and then decomposed to form a clear melt using muffle furnace at 600° C. The crucible was washed with water and the solution acidified with HCl. The solution was then heated to near to boiling, and 20 ml of 10% barium chloride was added to form a precipitate. The mixture was held in a hot water bath for 2 hours, cooled, and allowed to settle for 12 hours. The solution was then filtered, heated to 350° C. and ignited to form an ash. The material was then further heated to 600° C. for 3 hours in a furnace.

The sulfur content was calculated after ashing based upon the following equation:

$$Sulfur(wt\ \%) = [weight\ of\ the\ Ash(g) \times 0.1374 \times 100]/(weight\ of\ the\ sample(g))$$

Oligomer Content:

The oligomer content in the polymer samples was determined by Soxhlet reflux methods. Polymer samples were reflux with 1,4-dioxane for 2 hours in a mantle heater. After 2 hours, the refluxed sample is filtered through Whatmann 42 filter paper and the filtrate was transferred to a clean, dry, pre-weighed 100 ml glass beaker. The filtrate was then heated to dryness on a hot plate at 180° C. After drying, the beaker was kept in an air oven at 140° C. for 30 minutes. Finally, the oligomer content wt %) was calculated according to the following:

$$\{[(Beaker\ with\ Residue(g)) - (Empty\ Beaker(g))]/sample\ weight(g)\} \times 100.$$

The following examples are given for the purpose of illustrating various embodiments of the invention and are not meant to limit the present invention in any fashion. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

Example 1: Preparation of Sulfonated Co-Polyester (5 wt % Isophthalic acid, 16 wt % of a sulfonated monomer, and 30 wt % polybutylene terephthalate). To a 20 liter volume reactor equipped with a mechanical stirrer, a packed reflexing column, a nitrogen inlet and a heat source were added 2.03 kg of ethylene glycol, 0.5 kg of isophthalic acid (IPA), 4.176 kg of terephthalic acid, 3.35 g of antimony trioxide (280 ppm as antimony), 1.69 g of cobalt acetate (40 ppm as cobalt), and 2 g of sodium acetate (200 ppm as sodium acetate). Esterification was carried out at temperature of 240-260° C. under pressure up to 4.0 bar for 2-3 h. After completion of 90% esterification, the reactor was depressurized and sulfonated hydroxyl terminated ester, such as bis(2-hydroxyethyl) sodium κ-sulfoisophthalate solution was added.

The reaction mixture was subjected to a pressure in the range of 400 to 500 torr at a temperature in the range of 240 to 260° C. for up to 30 min to obtain a pre-polymer. The pre-polymer was the transferred into polycondensation reactor after phosphoric acid addition. The reaction mixture was then pressurized up to 760 torr by $N_2$ pressure and phosphoric acid added. The reaction mixture was held for 10 min for mixing. Polycondensation reaction was then carried out at temperature of 280 to 290° C. under a pressure of less than 0.2 torr. At the end of polycondensation, 3 kg of polybutylene terephthalate (PBT) was added and a pressure of 0.5 bar pressure was applied to melt and dissolve the PBT chips. After sufficient melt viscosity was achieved, polymerization was stopped. The molten polymer was cooled in the cold water and then chopped to form pellets. The intrinsic viscosity of the amorphous polymer was 0.35 dl/g and throughput of product from reactor was more than 93% (yield).

The molecular weight of the polymer may be significantly increased by first loading the polymer pellets on a tumble dryer and heating the contents under a stream of nitrogen up to 145° C. over a period of 7 h to get the crystallized polymer. After crystallization, high vacuum was applied to the dryer and the crystallized pellets are heated up to 195° C. for 15-0 h. This effects a solid state polymerization and allows molecular weight to be significantly increased, as reflected by the intrinsic viscosity (I. V.) of the polymer. The melting, crystallization and the glass transition temperatures of the polymer was measured using DSC and the results are summarized in Table 2.

The bis(2-hydroxyethyl) sodium 5-sulfoisophthalate used in herein was prepared separately as mentioned in the JP patent application 57023627. In a separate reactor, 1.6 kg of NaDMSIP and 4.8 kg of ethylene glycol were mixed to form a solution, and 0.1 wt % sodium acetate (with respect to NaDMSIP) was added to the solution. The solution was then stirred at a temperature up to 185° C. for 90 min. The by-product, i.e., methanol, was collected and the solution was kept as such for one hour at 200° C. to ensure complete conversion. The reaction mixture was allowed to cool and filtered to obtain a solid which was used as such without any further purification.

Example 2: Preparation of Sulfonated Co-Polyester

The procedure of Example 1 was repeated except that 16 wt % NaSIPA monomer was used in place of NaDMSIP and the results are summarized in Table 2, below.

Comparative Example 1

Preparation of co-polyester (12 wt % isophthalic acid, 16 wt % NaDMISP; without polybutylene terephthalate). To a 20 liter reactor equipped with a mechanical stirrer, a packed reflexing column, a nitrogen inlet and a heat source were added 3.15 kg of ethylene glycol, 1.20 kg of isophthalic acid, 6.07 kg of terephthalic acid, 3.35 g of antimony trioxide (280 ppm as antimony), 1.69 g of cobalt acetate (40 ppm as cobalt), and 2 g of sodium acetate (200 ppm as sodium acetate). Esterification was carried out at temperature of 240-260° C. at a pressure of up to 4.0 bar for 2-3 hours. After completion of 90% esterification, the reactor was depressurized and 6 kg of a sulfonated hydroxyl terminated ester, such as bis (2-hydroxyethyl) sodium 5-sulfoisophthalate solution, was added. The reaction mixture was subjected to a pressure of 400 to 500 torr at a temperature of 240 to 260° C. for up to 30 min to obtain a pre-polymer. The reaction mixture pressurized up to 760 torr by $N_2$ pressure and phosphoric acid added. The reaction mixture was held for 10 min for mixing. The pre-polymer was transferred into polycondensation reactor. A polycondensation reaction was then carried out at temperature 280-290° C. under a pressure of less than 0.2 torr. When sufficient melt viscosity was achieved, polymerization was stopped, and the polymer was emptied from reactor through die at the bottom. The molten polymer comes out from the die as strand and was cooled in cold water. Because of high melt strength of the polymer, it was difficult to cut the strands into pellets. The intrinsic viscosity of the amorphous polymer was 0.28 dl/g and throughput of product from reactor was about 75% (yield). Crystallization peak or melting peak was not observed in the DSC analysis curve. The polymer has high amorphous nature and low melting point. Attempts to increase the molecular weight of the polymer failed as the product was sticking at 100° C.

Comparative Example 1

Preparation of co-polyester (12 wt % isophthalic acid, 16 wt % NaDMSIP, and 7.5 wt % diethylene glycol; no polybutylene terephthalate). To a 20 liter volume reactor equipped with a mechanical stirrer, a packed reflexing column, a nitrogen inlet and a heat source was added 2.52 kg of ethylene glycol, 1.20 kg of isophthalic acid, 5.803 kg of terephthalic acid, 0.75 kg of diethylene glycol, 3.35 g of antimony trioxide (280 ppm as antimony), 1.69 g of cobalt acetate (40 ppm as cobalt), and 2 g of sodium acetate (200 ppm as sodium acetate). Esterification was carried out at temperature of 240-260° C. under pressure up to 4.0 bar for 2 to 3 hours. After completion of 90% esterification, the reactor was depressurized and sulfonated hydroxyl terminated ester, such as bis(2-hydroxyethyl) sodium 5-sulfoisophthalate solution was added. The reaction mixture was subjected to a pressure in the range of 400 to 500 torr at a temperature in the range of 240 to 260° C. for up to 30 min to obtain a pre-polymer. The pre-polymer was transferred into polycondensation reactor after phosphoric acid addition. Polycondensation reaction was carried out at temperature 280-290° C. under pressure of less than 0.2 torr. When sufficient melt viscosity was achieved, polymerization was stopped, and the polymer was emptied from reactor through die at the bottom of the reactor. The molten polymer that comes out from the die as strand was cooled in the cold water and then chopped to form pellets. The intrinsic viscosity of the amorphous polymer was 0.35 dl/g and throughput of product from reactor was about 85% (yield). The amorphous polymer exhibits reduced melt viscosity but higher throughput as compared to the polyester described in Example 3. Crystallization peak or melting peak was not observed in the DSC analysis curve. While quenching the polymer strands in cold water for casting, it was observed that the polymer was soluble in water. Attempts to increase the molecular weight of the polymer failed as the product was sticking at 100° C.

Examples 3 to 11

Preparation of polymers. As outlined in Table 1, different polymer/polyesters were synthesized by using a procedure similar to that of Example 1. Raw material quantities in Table 1 are in wt %, with respect to the polymer. The remaining quantity is terephthalic acid. The melting temperature ($T_m$), crystallization temperature ($T_{ch}$), and $T_g$ of the co-polyester were measured using DSC, and the results are summarized in Table 2, below.

TABLE 1

Formulations for making various co-polyesters

| Example # | IPA | NaSIPA | NaDMSP | DEG | PEG | NA | PBT | PTN |
|---|---|---|---|---|---|---|---|---|
| 1 | 5 | | 16 | | | | 30 | |
| 2 | 5 | 16 | | | | | 30 | |
| 5 | | 20 | | | | 0.5 BaSO$_4$ | 15 | |
| 6 | | | 20 | | | | 20 | |
| 7 | | | 25 | | | | 20 | |

TABLE 1-continued

Formulations for making various co-polyesters

| Example # | IPA | NaSIPA | NaDMSP | DEG | PEG | NA | PBT | PTN |
|---|---|---|---|---|---|---|---|---|
| 8 | 5 | 14 | | | | 0.5 Silica | 25 | |
| 9 | 8 | 12 | | | 3 | | | 20 |
| 10 | 5 | 18 | | | | 0.5 Silica + 0.2 BaSO$_4$ | 20 | |
| 11 | 5 | | 18 | | | | | 25 |
| 12** | | | 20 | | | | 20 | 0 |
| Comparative Ex. 1 | 12 | | 16 | | | | Nil | |
| Comparative Ex. 2 | 12 | | 16 | 7.5 | | | Nil | |

**With post-consumer recycled flakes
DEG is diethylene glycol;
PEG is polyethylene glycol;
NA is nucleating agent;
PBT is polybutylene terephthalate; and
PTN is polytrimethylene terephthalate.

Example 12

Synthesis of co-polyester using post-consumer recycled (per)polyethyleneterephthalate flakes. To a 20 liter volume reactor equipped with a mechanical stirrer, a packed reflexing column, a nitrogen inlet and a heat source were added 6.01 kg of post-consumer recycled flakes, 1.55 kg of meg (for glycolysis of post-consumer recycled flakes), 0.845 g of cobalt acetate (20 ppm as cobalt). Glycolysis was carried out at a temperature of 240-250° C. under pressure at a range of 2-3 bar for 1-2 h. After glycolysis, sulfonated hydroxyl terminated ester, such as bis(2-hydroxyethyl) sodium 5-sulfoisophthalate solution was added. The reaction mixture was subjected to a pressure in the range of 400 to 500 torr at a temperature in the range of 240 to 260° C. for up to 30 min to obtain a pre-polymer. The reaction mixture pressurized up to 760 torr by $N_2$ pressure and phosphoric acid added. The reaction mixture was held for 10 min for mixing. The pre-polymer was transferred into polycondensation reactor. Polycondensation reaction was carried out at temperature 280-290° C. at a pressure of less than 0.2 torr. Then 20 wt % of polybutylene terephthalate was added at the end of polycondensation and a pressure of 0.5 bar was applied to melt and dissolve all PBT chips. When sufficient melt viscosity was achieved, the polymerization was stopped, and the polymer was emptied from reactor through die at the bottom. The molten polymer that comes out from the die as strand was cooled with cold water and then chopped to form pellets. The intrinsic viscosity of the amorphous polymer was 0.37 dl/g and throughput of product from reactor was about 93% (yield).

The molecular weight of the polymer can be significantly increased by first loading the polymer pellets on a tumble dryer and heating the contents under a stream of nitrogen up to 145° C. over a period of 7 h to get the crystallized polymer. After crystallization, high vacuum was applied to the dryer and the crystallized pellets are heated up to 195° C. for 15 to 20 hours. This effects a solid state polymerization and allows molecular weight to be significantly increased. The intrinsic viscosity (I.V.) of the polymer was about 0.52 dl/g.

The melting, crystallization and the glass transition temperatures of the copolymers were measured using DSC and the results are summarized in Table 2.

TABLE 2

Analysis of the sulfonated polyesters

| | | | | | SSP Sample Analysis | | | | |
|---|---|---|---|---|---|---|---|---|---|
| Ex. # | I.V. (Dl/g) | Yield (wt %) | —COOH (Meq/kg) | DEG (wt %) | I.V. (Dl/g) | $T_g$ (° C.) | $T_{ch}$ (° C.) | $T_m$ (° C.) | Oligomer content (wt %) |
| 1 | 0.35 | 93 | 38 | 3 | 0.4 | 66 | 169 | 217 | 0.28 |
| 2 | 0.38 | 95 | 55 | 7 | 0.52 | 62 | 170 | 209 | 0.23 |
| 3 | 0.32 | 92 | 51 | 6 | 0.50 | 61 | 172 | 210 | 0.30 |
| 4 | 0.33 | 94 | 42 | 3.5 | 0.48 | 62 | 169 | 210 | 0.25 |
| 5 | 0.31 | 90 | 42 | 3.8 | 0.5 | 64 | 175 | 208 | 0.30 |
| 6 | 0.38 | 93 | 50 | 6 | 0.52 | 62 | 167 | 210 | 0.28 |
| 7 | 0.38 | 93 | 48 | 5.5 | 0.50 | 59 | 162 | 203 | 0.23 |
| 8 | 0.35 | 93 | 45 | 7.5 | 0.48 | 61 | 168 | 210 | 0.30 |
| 9 | 0.36 | 92 | 43 | 4 | 0.5 | 63 | 167 | 209 | 0.25 |
| 10** | 0.35 | 96 | 35 | 2.5 | 0.52 | 66 | 165 | 215 | 0.30 |
| Comp. 1 | 0.31 | 75 | 45 | 3 | | | | | 5.0 |
| Comp. 2 | 0.33 | 85 | 45 | 10 | | | | | 4.8 |

**With post-consumer recycled flakes

As discussed above, polymer described in Comparative Examples 1 and 2 are prepared without using fast crystallizing polyester. Both polyesters failed to show crystallization and melting peaks, due to the highly amorphous nature of polyesters. Further, the polyesters exhibit a high oligomer content and a very low reactor throughput due to high melt viscosity.

The polymer described in Examples 1 and 2 includes 5 wt % IPA, 16 wt % of sulfonated monomer and 30 wt % of PBT crystallization peaks at 169° C. and 170° C., respectively. The oligomer content of both the polyesters described in Example 1 and 2 is less than 0.5 wt % and has high reactor throughput.

The polymer described in Examples 3, 6, and 8 are prepared by adding a nucleating agent with polybutylene terephthalate, as the fast crystallizing polyester. The polyesters are crystallizable at temperature range of 168° C. to 172° C., and they exhibit oligomer content below 0.30 wt %.

Polytrimethylene terephthalate is used as fast crystallizing polyester in polyester described in example 7 and 9. These polyesters show low Tch (crystallization temperatures) values, good reactor throughput, and low oligomer content. The polyester described in Example 10 utilizes post-consumer recycled flakes in place of purified terephthalic acid and monoethylene glycol. High reactor throughput of about 96% is obtained by using post-consumer recycled flakes. The crystallizing temperature of the co-polyester is 165° C., and the oligomer content is below 1 wt %.

The present invention, thus generally described, will be understood more readily by reference to the following examples, which are provided by way of illustration and are not intended to be limiting of the present invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges or a combination of any two or more of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A sulfonated co-polyester product for use in fiber and yarn manufacturing, the co-polyester product exhibiting:
    a polyethylene terephthalate equivalent intrinsic viscosity of up to 1.2 dL/g;
    an oligomer content of less than 1.5 wt %;
    a diethylene content of less than 1.5 wt %;
    a carboxylic end groups of less than 100 meq/kg;
    a crystallinity greater than 20%; and
    a sulfonated salt content greater than 15 wt %;
    wherein:
        a blend of the sulfonated co-polyester with polyethylene terephthalate exhibits a greater cationic dyeing affinity than a non-blended polyethylene terephthalate; or
        a blend of sulfonated co-polyester with a nylon exhibits improved stain resistance compared to a non-blended nylon.

2. A crystallizable sulfonated co-polyester masterbatch comprising ≥15 wt % of a sulfonated salt and an oligomer content less than 1.5 wt % of the sulfonated co-polyester.

3. The crystallizable sulfonated co-polyester of claim 2, having a polyethylene terephthalate equivalent intrinsic viscosity of up to 1.2 dL/g.

4. The crystallizable sulfonated co-polyester of claim 2 further comprising a compatibilizer up to 10 wt % of the total composition.

5. A method of preparing the sulfonated co-polyester product of claim 1, the method comprising:
    polymerizing a first pre-polymer with a second pre-polymer to form a metal sulfonated co-polymer;
    reacting the metal sulfonated co-polymer with a fast crystallizing polyester block having a degree of polymerization of at least about 20 to provide an amorphous sulfonated co-polyester; and
    crystallizing the amorphous sulfonated co-polyester to form a crystallized sulfonated co-polyester;

wherein:
the first pre-polymer comprises the reaction product of a dicarboxylic acid or ester thereof, and a first alkylene diol; and
the second pre-polymer comprises the reaction product of an aromatic sulfonate or a salt or ester thereof, with a second alkylene diol.

6. The method of claim 5 further comprising subjecting the crystallized sulfonated co-polyester to solid state polymerization.

7. The method of claim 5, wherein the first pre-polymer comprises an alkylene aryl dicarboxylate co-polymer having a degree of polymerization greater than or equal to 4.

8. The method of claim 5, wherein the metal sulfonated co-polyester comprises about 40 wt % to about 90 wt % of the first pre-polymer.

9. The method of claim 5, wherein the second pre-polymer has a degree of polymerization from 2 to 20.

10. The method of claim 5, wherein the metal sulfonated co-polyester comprises about 5 wt % to about 40 wt % of the second pre-polymer.

11. The method of claim 5, wherein the dicarboxylic acid or ester thereof comprises an aliphatic dicarboxylic acid, an aliphatic dicarboxylate, a cycloaliphatic dicarboxylic acid, a cycloaliphatic dicarboxylate, an aromatic dicarboxylic acid, or an aromatic dicarboxylate.

12. The method of claim 5, wherein the first alkylene diol comprises ethylene glycol, diethylene glycol, propanediol, butanediol, cyclohexanedimethanol, or hexane diol and the second alkylene diol comprises ethylene glycol, diethylene glycol, propanediol, butanediol, cyclohexanedimethanol, hexane diol, octanediol, decanediol, or dodecanediol.

13. The method of claim 5, wherein the aromatic sulfonate salt comprises a metal that is Li, Na, K, Mg, Ca, Ni, or Fe.

14. The method of claim 5, wherein the aromatic sulfonate comprises terephthalic acid sulfonate, isophthalic acid sulfonate (SIPA), 2,6-naphthalene dicarboxylic acid sulfonate, 3,4'-diphenyl ether dicarboxylic acid sulfonate, hexahydrophthalic acid sulfonate, 2,7-naphthalenedicarboxylic acid sulfonate, phthalic acid sulfonate, 4,4'-methylenebis (benzoic acid) sulfonate, or a salt thereof.

15. The method of claim 5, wherein the fast crystallizing polyester comprises polybutylene terephthalate, polypropylene terephthalate, polybutylene naphthalate, or polypropylene naphthalate.

16. The method of claim 5, wherein the fast crystallizing polyester is present at about 1 wt % to about 30 wt % of the total weight of the co-polyester.

17. The method of claim 5, wherein the first pre-polymer is prepared by reacting the dicarboxylic acid or ester thereof with the first alkylene diol at a temperature of about 240° C. to about 260° C., and at a pressure of up to about 4 bars for 2 hours to 3 hours.

18. The method of claim 5, further comprising melt blending the sulfonated co-polyester with a nylon or a polyester, extruding a filament, and spinning the filament into a fiber or yarn.

* * * * *